July 19, 1966 R. BAKIS 3,261,916

ADJUSTABLE RECOGNITION SYSTEM

Filed Nov. 16, 1962

2 Sheets-Sheet 1

INVENTOR
RAIMO BAKIS

BY John J Goodwin

ATTORNEY

United States Patent Office 3,261,916
Patented July 19, 1966

3,261,916

ADJUSTABLE RECOGNITION SYSTEM

Raimo Bakis, Ossining, N.Y., assignor to International Business Machines Corporation, New York, N.Y., a corporation of New York Filed Nov. 16, 1962, Ser. No. 238,144
9 Claims. (Cl. 179—1)

The present invention relates to recognition devices and more particularly to an automatic adjustment device for adapting a speech recognition device for response to the voices of different speakers.

It is known that mechanical devices, for example typewriters, can be made to respond to speech input signals. Generally such systems include a microphone device for converting the speech signals into electrical signals having characteristic frequency components. The electrical signal is then applied to a filtering system which selects component frequencies of the signal. The location and amplitude of the component frequencies within the signals are used to determine the phonetic sounds represented by the signals.

For a particular speaker, the frequency components for a phonetic sound generally fall within particular frequency boundaries. For example, when a particular speaker speaks the phonetic sound "s" a number of times, the most intense frequency components of the speech signal for that phonetic sound will be located each time within an area boundaried by particular frequencies.

The phonetically responsive system also includes a recognition device which would respond to the frequency components within the various boundaries by registering or printing out the associated phonetic symbols. A basic requirement for such systems is that the recognition device must be adjusted such that the boundary frequencies within which the frequencies of the different phonetic sounds are located are established for a given speaker. If a different speaker operates the system, it is possible that when the different speaker voices a phonetic sound, the boundaries for the component frequencies of such sound may be different than when the first speaker voices the identical phonetic sound. For example, one speaker may have greater nasal or sibilant speech qualities than another speaker. Thus, when a second speaker uses the speech responsive system adjusted for the first speaker, the recognition device, having determined that the phonetic sound does not fall within the adjusted boundaries, would not produce an output symbol associated with the phonetic sound being spoken. One way to overcome this disadvantage would be to adjust the speech responsive system for a particular speaker and manually readjust the system for other different speakers. This requirement has many disadvantages. The characteristics of the different speakers must be known in advance. The frequency boundaries of the phonetic sounds as spoken by each speaker must be determined and the corresponding adjustment of the system must be derived and performed.

There are ways to avoid the necessity for manually adjusting the speech responsive system. One approach is described in U.S. Patent 2,921,133 entitled, "Phonetic Typewriter of Speech (Responsive to All Voices)" issued January 12, 1960 to M. V. Kalfaian. This patent teaches that the speech signals may be modified prior to being introduced into the recognition device. The speech signals are standardized. In this manner the basic resonances of each phonetic sound, regardless of the speaker's pitch, would be located in a standard region (boundaries) of the voice spectrum.

In the present invention a system is provided wherein it is not necessary to standardize the input speech signal and wherein it is unnecessary to manually readjust the system to compensate for different speakers.

An object of the present invention is to provide a voice responsive system having an automatic adjustment feature for adjusting to the voices of different speakers.

Another object of the present invention is to provide a voice responsive system wherein the frequency boundaries determining the regions of separate phonemes are automatically adjusted.

A further object of the present invention is to provide a voice responsive system wherein the statistics of phoneme occurrence are employed to determine the required adjustment of the system.

A feature of the present invention is the provision of an adjustable threshold device in a voice responsive system which is adjusted in response to the system output.

The foregoing and other objects, features and advantages of the invention will be apparent from the following more particular description of a preferred embodiment of the invention, as illustrated in the accompanying drawings.

Figures 1, 3:
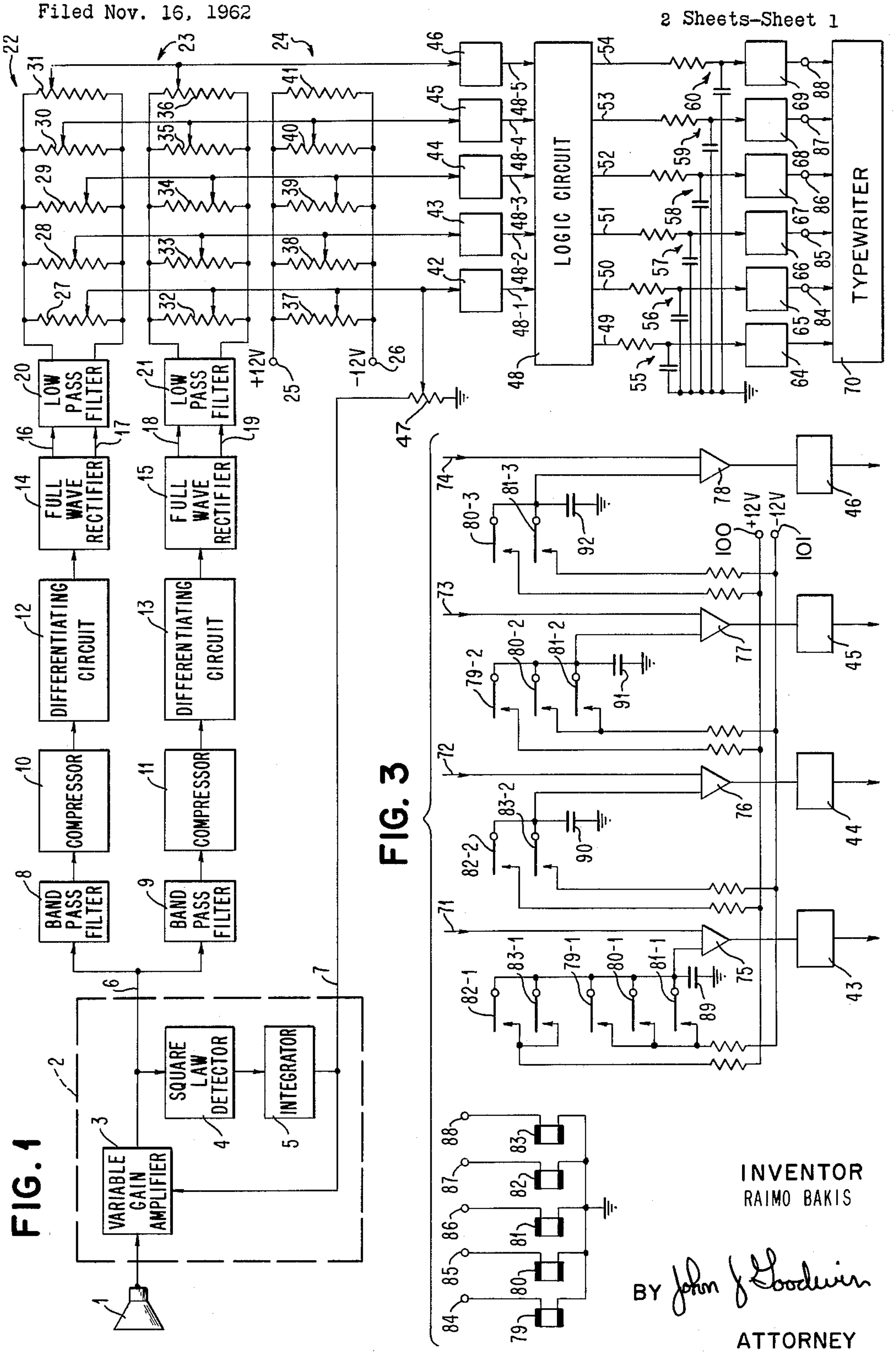
FIG. 1 is a schematic diagram of a voice responsive system in accordance with the principles of the present invention.
FIG. 3 is a schematic illustration of a circuit for providing an automatic adjustment feature for the system of FIG. 1.

Referring to FIG. 1, a voice responsive system is shown which is responsive to voice input signals and typewrites the phonetic symbols representative of the voice information. For the sake of clarity and brevity the system described in relation to FIG. 1 will be limited to the recognition and processing of five phonemes although it is understood that a system for handling a greater number of phonemes could as well be presented without any basic change in principles.

The system of FIG. 1 operates as follows. A voice signal is introduced into microphone 1 by the speaker. The signal from microphone 1 is applied as an input to compressor 2. Compressor 2 includes variable gain amplifier 3, square law detector 4 and integrator 5. Compressor 2 maintains the total level of the voice signal constant and the constant level voice signal appears on output lead 6, while an automatic gain control signal appears on output lead 7 and is later employed for rejecting background noise.

The voice signal on lead 6 is applied to two band pass filters 8 and 9. Band pass filter 8 is tuned to the 300–1200 cycles per second range and band pass filter 9 is tuned to the 1000–4000 c.p.s. range. The range of filter 8 corresponds to the first formant frequency and the range of filter 9 corresponds to the second formant frequency of the signal. The outputs of filters 8 and 9 are passed through compressors 10 and 11 similar to compressor 2, differentiating circuits 12 and 13, and full wave rectifier circuits 14 and 15. Differentiating circuits 12 and 13 are employed because they are frequency selective circuits, and may be replaced by other known types of frequency selective circuits. Also, if differentiating circuits 12 and 13 are selected to have a 3 decibel per octave slope, then full wave rectifier circuits 14 and 15 may be replaced by square law detectors. Full wave rectifier circuits 14 and 15 each have two output leads 16, 17 and 18, 19, respectively. The signals on each one of the pairs of output leads from the rectifiers represent the result of full wave rectification of the speech signal but the signals on leads 16 and 18 are positive and those on leads 17 and 19 are negative.

The rectified signals on leads 16, 17 and 18, 19 are applied to low pass filter circuits 20 and 21. Filters 20 and 21 have a 0–16 c.p.s. pass band and a 12 db per octave slope in the cut-off region. The output signals from filters 20 and 21 represent the first and second formant frequencies of the phonemes.

The output signals from low pass filter 20, representing the first formant, are applied to a first potentiometer circuit 22 and the signals from low pass filter 21 are applied a second potentiometer circuit 23. A third potentiometer circuit 24 is also provided and is supplied positive and negative constant potential sources at terminals 25 and 26 respectively. The potentiometer circuits 22, 23 and 24 include a plurality of separate potentiometers arranged in parallel across their respective input terminals. The potentiometer circuits 22, 23 and 24 establish the boundaries of the phoneme regions previously discussed by establishing constants $k_1$, $k_2$ and $k_3$ to be later described.

Figures 2, 4:
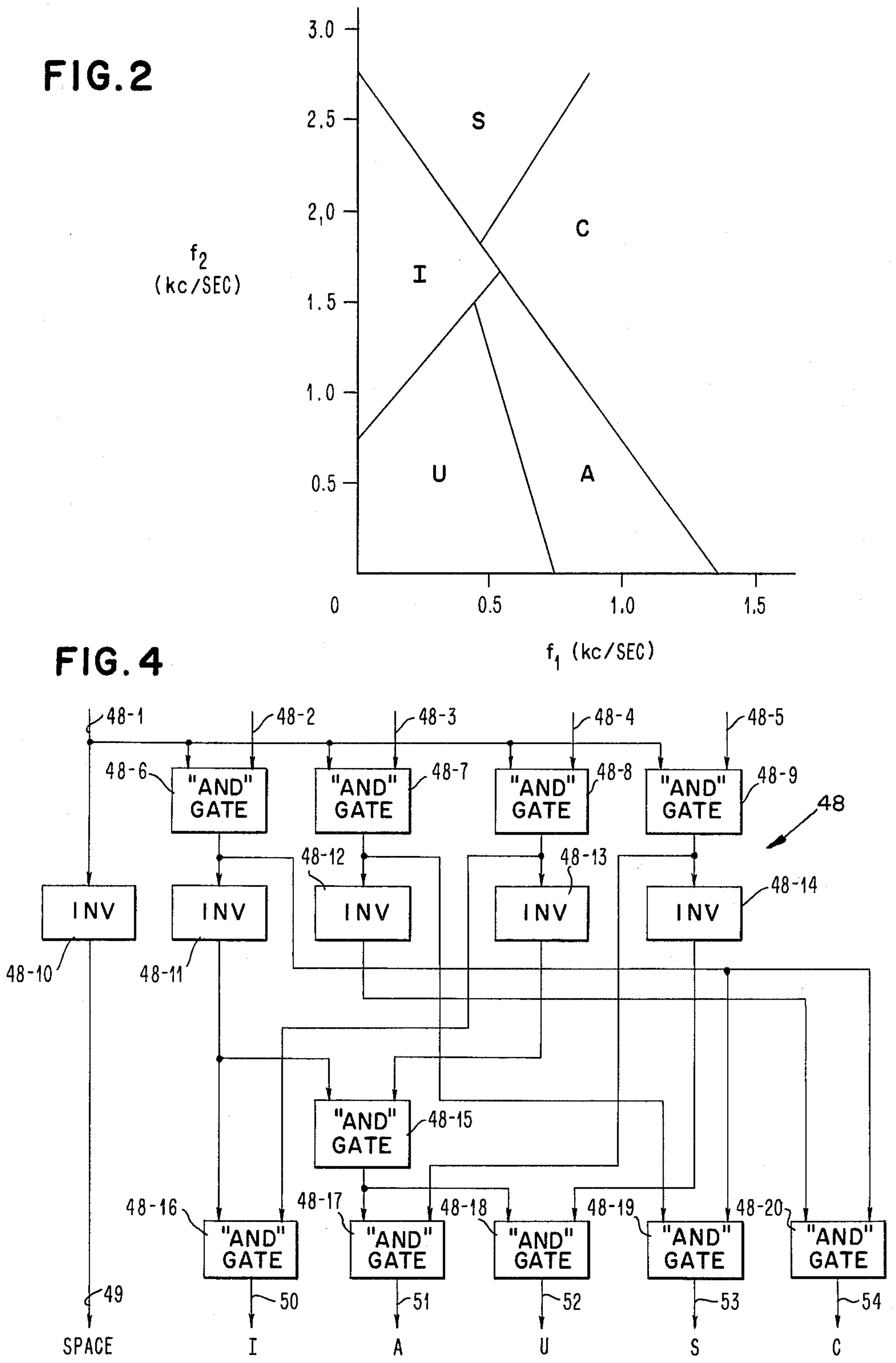
FIG. 2 is an illustration of the frequency regions of particular phonemes as spoken by a particular speaker.
FIG. 4 is a detailed illustration of the logic circuit employed in FIG. 1.

Prior to a description of the operation of the potentiometer circuits, a more complete discussion of the phoneme regions will be useful. Referring to FIG. 2, an illustration is shown of five phoneme regions for a particular speaker. The five phonemes which the present system is designed to be responsive to are designated as A, U, I, S and C. The phonetic sounds represented by these symbols are: A is "a" and as in sat; U is "oo" as in pool; I is "ee" as in beet; S is "s" as in cease; and C is "ss" as in mission. Whether a sound is U or A is indicated by the first and second formants of the sound signal. Thus, for the boundaries shown for a particular speaker in FIG. 2, when the second formant ($f_2$) is 0.5 kc./sec. and the first formant $f_1$ is also 0.5 kc./sec., the phoneme is U. However, for the same second formant frequency but a high first formant frequency (i.e., 1.0 kc./sec.) the phoneme is A, but if the second formant also is increased to 1.0 kc./sec. the phoneme is C. The boundaries between the different phonemes can, for practical consideration, be determined by straight lines having either positive or negative slopes. The mathematical equations of the straight lines include the first and second formants as variables. Thus the general equation for a line is expressed as:

$$y+mx+b=0 \qquad (1)$$

where $m$ is slope and $b$ is a constant.

In the present case the equation would appear as:

$$f_2+mf_1+b=0 \qquad (2)$$

In the present system, as will be later discussed, the boundary lines will be established by potentiometers which produce fractions of $f_1$ and $f_2$, so Equation 2 will be multiplied by a fractional quantity $k$ to produce:

$$kf_2+kmf_1+kb=0$$

which can be reduced to:

$$k_1f_1+k_2f_2+k_3=0 \qquad (3)$$

It is to be noted that the constant "$k_3$" in Equation 3 determines the distance of the line from the origin when one of the variables is zero. Also, when $k_1$, $k_2$ and $k_3$ are established, values of $f_1$ and $f_2$ which cause the expression on the left side of Equation 3 to be greater than zero are located in the region on one side of the boundary line and values of $f_1$ and $f_2$ which produce a total value less than zero are located in the region on the other side of the boundary line. By changing the value of "$k_3$" the boundary line is shifted without changing slope. This is significant in that when it is desired to vary the phoneme regions for different speakers it can be accomplished by shifting the boundary lines.

One way of shifting the boundary line is to establish an electrical analog of the boundary line Equation 3, thus the boundary line can be shifted by varying the signal representative of $k_3$.

Referring again to FIG. 1, it was stated that the first formant $f_1$ is applied to potentiometer circuit 22 which includes potentiometers 27, 28, 29, 30 and 31. Likewise the second formant $f_2$ is applied to potentiometer circuit 23 which includes potentiometers 32, 33, 34, 35 and 36. A constant signal is applied to potentiometer circuit 24 which includes potentiometers 37, 38, 39, 40 and 41. The wiper arms of each of the potentiometers 27 through 41 are adjustable and are set at given positions. If desired, a high input impedance amplifier followed by a fixed resistor may be connected in series in each of the wiper arms to provide isolation and to prevent short circuits.

Postponing for the present a discussion of potentiometers 27, 32 and 37 which form a first linear combination circuit, consider potentiometers 28, 33 and 38 which form a second linear combination circuit. The first formant signal $f_1$ is applied across potentiometer 28 and a given fraction thereof $k_1f_1$ appears on the related wiper arm. The second formant $f_2$ is applied across potentiometer 33 and a given fraction thereof $k_2f_2$ appears on the wiper arm and is combined with the signal from potentiometer 28 to provide a signal expressed as $k_1f_1+k_2f_2$. A constant signal $k_3$ is present on the wiper arm of potentiometer 38 and combines with the signal from potentiometers 28 and 33 to produce the signal expressed as $k_1f_1+k_2f_2+k_3$. By setting the signal thus expressed to zero, a straight line equation is determined, or more significantly, a boundary line between phoneme regions can be determined wherein values of $f_1$ and $f_2$ causing a greater than zero result lie in one phoneme region and values of $f_1$ and $f_2$ causing a less than zero result lie in another phoneme region. By the proper setting of potentiometers 28, 33 and 38 the constants $k_1$, $k_2$ and $k_3$ which determine, for example, the boundary line which separates the S and C regions from the I, A and U regions (FIG. 2) can be established. This being accomplished, the signal is then applied to threshold circuit 43. The expression is effectively set equal to zero by the threshold level such that if the signal applied to threshold circuit 43 is greater than the threshold value it indicates that the values of $f_1$ and $f_2$ are found in the S or C regions to the right of the boundary line in FIG. 2 and if the signal is below the threshold value it indicates that the formant frequencies are present in the I, A or U regions to the left of the boundary line. The output signal from threshold circuit 43 will be either a "1" for signals above the threshold or a "0" bit for signals below the threshold.

In a similar manner the wiper arms of potentiometers 29, 34 and 39 which form a third linear combination circuit are set to a different set of constants $k_{12}$, $k_{22}$ and $k_{13}$ such that the resulting signal at the input of threshold circuit 44 is expressed as $k_{12}f_1+k_{22}f_2+k_{13}$ and determines a second one of the boundary lines depicted in FIG. 2, for example, the boundary line on FIG. 2 separating phoneme region S from phoneme region C. Threshold circuit 44 is set at a level such that signals greater than the threshold contain formants located above such line and produce a "1" bit output indicating the S region while signals below the threshold (having formant frequencies located below the line) produce a "0" bit output indicating the C region.

Likewise, the wiper arms of potentiometers 30, 35 and 40 which form a fourth linear combination circuit are set to provide a third set of constants, which, in coaction with the formant signals $f_1$ and $f_2$ determine a third one of the boundary lines depicted in FIG. 2, for example, the boundary line separating the I phoneme region from the U and A phoneme regions. Threshold circuit 45 is set such that signals above the threshold indicate formants located above the boundary line and produce a "1" bit indicating the I region whereas signals below the threshold indicate formants located below the boundary line and produce a "0" bit indicating the U or A regions.

Finally, potentiometers 31, 36 and 41 which form a fifth linear combination circuit are set to provide constants which determine the remaining boundary line in FIG. 2, the one separating the U phoneme region from the A phoneme region. Threshold circuit 46 is set to provide a "1" bit for signals to the right of the boundary indicating the A region and a "0" bit for signals to the left of the boundary line indicating the U region.

It is seen therefore that for sounds spoken into microphone 1 having particular values of formant frequencies $f_1$ and $f_2$, the outputs from threshold circuits 43, 44, 45 and 46 will be binary signals representative of the position of the formant frequencies with respect to the boundary lines established by the potentiometer circuits 22, 23 and 24.

The remaining potentiometers 27, 32 and 37 which form the first linear combination circuit and threshold circuit 42 do not relate to a phoneme boundary line but serve to distinguish silence (space) from background noise. A signal representative of the total power in the speech signal is obtained from compressor 2 on lead 7. The total power signal on lead 7 is applied across a potentiometer 47, the wiper arm of which is connected in common with the wiper arms of potentiometers 27, 32 and 37. Thus fractions of the amplitudes of the formant frequencies are combined with a fraction of the amplitude of the total power.

The formant frequencies are combined with the total power for the sound-silence discrimination rather than the total power alone, because some sounds have inherently lower total power amplitudes than others. Consonants are passed at lower total power than vowels, however, consonants also have higher first and second formants. Thus, by combining total power with the formants the different in the variation of the total power of different sounds is compensated for. Threshold circuit 42 is set at a level such that speech signals above the threshold will be conducted through to logic circuit 48 whereas signals below the threshold level are considered to be noise and are rejected. The signals passing through threshold circuit 42 are used to gate the logic circuit 48 so that signals appear at the output of logic circuit 48 only when a signal is passed through threshold circuit 42.

The outputs of threshold circuits 43, 44, 45 and 46, which are binary signals representative of the position of the formant frequencies with respect to the boundary lines, are applied as input signals to logic circuit 48.

Logic circuit 48 processes the binary signals from the threshold circuits 43 through 46 and decides which phoneme region the sound falls in at every instant of time.

Logic circuit 48 is shown in detail in FIG. 4. There are five input leads 48–1, 48–2, 48–3, 48–4 and 48–5 coupled respectively to the outputs of threshold circuits 42, 43, 44, 45 and 46. A "1" bit signal on input lead 48–1 indicates the presence of sound (rather than silence) and is applied as a gate signal to "AND" circuits 48–6, 48–7, 48–8, 48–9 and 48–18. The signal on lead 48–1 is also applied to inverter 48–10 so that when there is a silent period ("0" bit input) a "1" bit signal from inverter 48–10 will cause the "space" bar of the phonetic typewriter to be actuated. When "sound" is present, "AND" circuits 48–6 through 48–9 are gated such that the "1" bit signals representative of the location of the formant frequencies with respect to phoneme boundary lines which are present on the input leads 48–2 through 48–5 will be gated through to inverter circuits 48–11 through 48–14 to provide "0" bit signals.

It was previously stated that the state of the input signals on leads 48–2 through 48–5 determine the phoneme regions shown in FIG. 2. For example, if the signal on lead 48–2 is a "1" bit, the phoneme is either S or C and not I, A or U. If, at the same instant, the signal on lead 48–3 is a "0" bit, the phoneme is determined as C.

For convenience, Table I below illustrates the phoneme regions determined by the presence of a "1" bit or a "0" bit on input leads 48–2 through 48–5.

TABLE I

| Input Lead | "1" Bit | "0" Bit |
|---|---|---|
| 48–2 | C or S | I, A or U. |
| 48–3 | S | C. |
| 48–4 | I | A or U. |
| 48–5 | A | U. |

By rearranging Table I, the signal conditions on the input leads which must be present to determine the phonemes can be set forth in Table II.

TABLE II

| Phoneme | "1" Bit | "0" Bit |
|---|---|---|
| I | 48–4 | 48–2 |
| A | 48–5 | 48–2, 48–4 |
| U | | 48–2, 48–4, 48–5 |
| S | 48–2, 48–3 | |
| C | 48–2 | 48–2 |

Referring to FIG. 4, it is seen that the arrangement of the logic elements satisfy the conditions set forth in Table II. Thus a "1" bit on lead 48–4 and a "0" bit on lead 48–2 (through inverter 48–11) gates "AND" circuit 48–16 providing a signal on "I" lead 50. At the same time the "0" bit on lead 48–2 inhibits the S and C "AND" circuits 48–19 and 48–20, while the "1" bit on lead 48–4 (through inverter 48–13) inhibits "AND" circuit 48–15 which in turn prevents the gating of the A and U "AND" circuits 48–17 and 48–18. Likewise a "1" bit on lead 48–5 and a "0" bit on leads 48–2 and 48–4 will gate the A "AND" circuit 48–17 while inhibiting the remaining "AND" circuits 48–16, 48–18, 48–19 and 48–20. In the same manner it can be demonstrated that the binary conditions on input leads 48–2 through 48–5 will produce an output signal on particular ones of output leads 50 through 54 in accordance with logic expressed in Table II.

The output signals from logic circuit 48 representing the phonemes are not yet in condition to actuate the phonetic typewriter. In speech there are transitions between sounds which result in speech signals occuring in rapid succession for short lengths of time. To attempt to print out all these short, rapid signal would exceed the capabilities of the typewriter and would provide little useful information. Therefore, the output signals of the logic circuit on leads 50, 51, 52, 53 and 54 are treated as analog voltages and are filtered in low pass filters consisting of simple RC circuits 56, 57, 58, 59 and 60. The outputs of the filter circuits are connected to threshold circuits 65, 66, 67, 68 and 69. Thus a succession of short, rapid signals at any one of the outputs 50 through 54 of the logic circuit 48 accumulate in time in the filter circuits 56 through 60 to a voltage sufficient to pass throught threshold circuits 65 through 69 to operate typewriter 70.

The output signal from each one of threshold circuits 65 through 69 is representative of a separate one of the five phonemes for which the circuit was originally designed to be responsive. For example, an output signal from threshold circuit 65 indicates the presence of the phoneme I, an output signal from threshold circuit 66 indicates the phoneme A, circuit 67 is related to phoneme U, circuit 68 to phoneme S and circuit 69 to phoneme C.

The signals from threshold circuits 65 through 69 are applied to phonetic typewriter 70 and actuate the key solenoids such that a corresponding phonetic symbol is struck in response to the input signals.

The output of the sound-silence discriminating threshold circuit is also filtered in low pass RC filter 55 and applied to threshold circuit 64. Whenever a period of silence of sufficient duration occurs, the voltage in filter 55 will accumulate to a value sufficient to pass through threshold circuit 64 and actuate the space bar (not shown)

of typewriter 70. Thus spacing between words is obtained when the words are spoken with silences between them.

It was previously stated that the boundary lines determining the phoneme regions as shown in FIG. 2 may vary for different speakers. The boundary lines shown in FIG. 2 are for a particular speaker. If the system shown in FIG. 1 were arranged such that the boundary lines shown in FIG. 2 were established, the system would perform correctly when the particular speaker associated with the boundary lines was speaking. If another speaker were to use the system it is very possible, due to qualities in his speech, that when the phoneme U were spoken the formant frequencies may be of the order to fall within the region designated A in FIG. 2. The output of typewriter 70 would therefore be erroneous, striking an A each time the U phoneme is spoken. In the instance described, one necessary adjustment to the system would be to move the boundary line between the U and A phoneme regions to the right.

The moving of boundary lines can be accomplished in terms of the system by adjusting potentiometers 38, 39, 40 and 41. The adjusting of potentiometers 38 through 41 determine the constant $k_3$ of each of the boundary line equations. When potentiometers 39 through 41 are varied the boundary lines shift in position with respect to the $f_1$ and $f_2$ axes (FIG. 2) but retain the same slope. Shifting the boundary lines vary the area of the separate phoneme regions.

As previously stated, the adjusting of the potentiometers 38 through 41 to compensate for different speakers requires a knowledge of the characteristics of each new speaker so the adjustment may be properly made, and further requires that the adjustment be manual. Such procedure is time consuming and the system may not be used during the adjustment operation.

The present invention provides an automatic adjustment feature for use with the system of FIG. 1 wherein the boundary lines are continually being automatically adjusted during the operation of the system, and the qualities of each new speaker need not be known in advance.

Referring to FIG. 3, circuitry is shown which, when incorporated into the system of FIG. 1, will provide the automatic adjustment feature. The circuit of FIG. 3 is connected in series between the wiper arms of potentiometers 38, 39, 40 and 41 and the inputs of threshold circuits 43, 44, 45 and 46. Thus, lead 71 is connected to the wiper arm of potentiometer 38, lead 72 is connected to the wiper arm of potentiometer 39, lead 73 is connected to the wiper arm of potentiometer 40, and lead 74 is connected to the wiper arm of potentiometer 41. Threshold circuits 43, 44, 45 and 46 of FIG. 1 are also shown in FIG. 3. Of course, the direct connections between the wiper arms of potentiometers 38 through 41 and threshold circuits 43 through 46 shown in FIG. 1 are removed. In FIG. 3 the signals from potentiometers 38 through 41 are respectively connected to one input terminal of differential amplifiers 75 through 78 and the outputs of differential amplifiers 75 through 78 are respectively connected to the inputs of threshold circuits 43 through 46. Five relay coils 79, 80, 81, 82 and 83 are included having input terminals 84, 85, 86, 87 and 88 respectively. Terminals 84 through 88 are connected between threshold circuits 65 through 69 and typewriter 70 in FIG. 1 at the points designated by the similar reference numbers. Thus the presence of a signal from threshold circuit 65 indicating phoneme I actuates relay coil 79, phoneme signal A from threshold circuit 66 actuates relay coil 80, etc. When relay coil 79 is actuated it closes contacts 79–1 and 79–2, relay coil 80 closes 80–1, 80–2 and 80–3, relay coil 81 closes contacts 81–1, 81–2 and 81–3, relay coil 82 closes contacts 82–1 and 82–2, and relay coil 83 closes contacts 83–1 and 83–2.

The contacts of relays 79 through 83, when closed, serve to connect either the positive constant voltage signal at terminal 100 or the negative constant voltage signal at terminal 101 to the differential amplifiers 75 through 78. Capacitors 89, 90, 91 and 92 are connected between ground potential and the points where the relay contacts are coupled to differential amplifiers 75, 76, 77 and 78 respectively.

The operation of the automatic adjustment circuit of FIG. 3 is based on the observed fact that the distribution of phonemes, that is, their relative frequency of occurrence within spoken language, remain quite stable under widely varying conditions. The stability of phoneme occurrence within a running text is dicussed by Gustav Herdan on page 129 of his book entitled, "Type-Token Mathematics," Mouton & Co., 1960. Tables of the frequency of occurrence of phonemes are found in the text, "Relative Frequency of English Speech Sounds" by Godfrey Dewey, Harvard University Press, 1950. Thus, if a certain phoneme occurs more or less frequently in the output of the recognition system than it is known to occur in the language, it can be concluded that the recoginition system is making mistakes, and the nature of the mistakes can be determined by a comparison of the frequencies of occurrence of the phonemes in the system output and the frequencies of occurrence that have been established for the language.

The circuit of FIG. 3 provides a means of adjusting threshold levels such that when the phonemes occur in the correct statistical number the thresholds remain approximately constant, but if a phoneme occurs more frequently or less frequently than it should, the threshold levels are varied to reduce or increase the occurrence of that phoneme respectively. To illustrate, presume that the phoneme A was found to be occurring (printed-out) more frequently than it should according to statistics. This indicates that the area provided for the A phoneme region is too large and should be reduced in size. To accomplish this (see FIG. 2) the boundary line between the U and A regions is moved to the right, the boundary line between the I and A region is lowered, and the boundary line between the C and the A region is moved to the left. As previously stated, the signal input into threshold circuit 43 in FIG. 1 represents the boundary line between regions S and C and regions I, U and A. Increasing the threshold level of circuit 43 effectively shifts the boundary line to the right while decreasing the level shifts the line to the left. Likewise, increasing the threshold level of circuit 44 effectively raises the boundary line between the S region and the C region while decreasing the threshold level lowers the line. Increasing the threshold level of circuit 45 raises the boundary line between the I region and the U and A region while lowering the threshold level lowers the line. Increasing the threshold level of circuit 46 shifts the boundary line between the U region and the A region to the right while lowering the threshold level shifts the line to the left.

Thus, if for the case where the phoneme A was occurring too frequently (indicating system mistake) the boundary line between the U and A region (FIG. 2) should be moved to the right, the boundary line between the SC and I, A regions should be moved to the left, and the boundary line between the I and the U, A regions should be lowered to decrease the area of the A phoneme region. Stated in terms of threshold levels, the level of circuit 43 and 45 should be lowered and the level of circuit 46 should be raised.

In practice, the threshold levels of circuits 43 through 46 remain unchanged, but a bias signal is provided which is subtracted from the boundary line signal before entering the threshold circuits 43 to 46 and accomplishes the same result as varying the threshold level. In other words, if the threshold level of circuit 43 should be raised, a positive bias signal is subtracted from the boundary line input signal prior to it being introduced to circuit 43. Likewise, if the threshold level of circuit 43 should be lowered, a negative bias signal is subtracted from the boundary line signal input. For example, where the phoneme A is found to be occurring too frequently and it is desired to reduce the area of the A phoneme region by shifting the boundary lines in a manner as described hereinabove, the input signal to threshold circuit 43 is increased by subtracting a negative bias signal therefrom, the input signal to threshold circuit 45 is increased by subtracting a negative bias signal and the input signal to threshold circuit 46 is decreased by subtracting a positive bias signal therefrom.

The above-described bias signals are produced and subtracted from the inputs of threshold circuits 43 through 46 by the circuit of FIG. 3. The relay coils 79 through 83 are each coupled to a separate phoneme input signal to typewriter 70 (FIG. 1) via junctions 84 through 88 respectively. The relays are energized each time a phoneme is printed out and are de-energized after fixed time intervals. The relays 79 through 83 therefore momentarily close contacts which connect the positive and negative signals at terminals 84 and 85 to given ones of differential amplifiers 75 through 78. The positive and negative signals accumulate in capacitors 89, 90, 91 and 92. The charge in capacitors 89, 90, 91 and 92 is subtracted from the input signals to threshold circuits 43, 44, 45, 46 respectively by means of differential amplifiers 75, 76, 77 and 78. The amount of charge (positive and negative) flowing into the capacitors 89 through 92 when a phoneme is printed-out has little effect on the input signals to threshold circuits 43 through 46, particularly since the amplifiers 75 through 78 have high input impedance. However, the amount of charge accumulated when a phoneme is repeatedly printed out becomes significant such that occurrences of a phoneme above the statistical value will produce a charge in the associated capacitors which, when subtracted from the input signal to threshold circuit 42 through 46, produces the aforesaid boundary line shifts. The biasing of the input signals to threshold circuits 43 through 46 by varying the voltage of capacitors 89 through 92 has the same effect as varying the potentiometers 38 through 41.

When the phonemes occur in correct proportions, the capacitors 89 through 92 receive positive and negative charge which maintains zero net charge on the capacitor. Suppose, however, that the phoneme A occurs more than is statistically correct. Each time phoneme A occurs, relay 80 is energized closing contacts 80–1, 80–2 and 80–3. Closing these contacts serves to add negative charge to capacitors 89 and 91 and positive charge to capacitor 92. As the negative charge in capacitors 89 and 91 and the positive charge in capacitor 92 accumulate, they are subtracted from the input signals to threshold circuits 43, 45 and 46. The result of the subtraction is to increase the input signals to threshold circuits 43 and 45 and decrease the input signal to threshold circuit 46. This results in a greater probability of a "1" bit on input leads 48–2 and 48–4 and a "0" bit on input lead 48–5. Referring to Tables I and II, it is seen that this serves to decrease the occurrences of the phoneme "A" and increases the occurrence of the phonemes in the neighboring regions.

In like manner it can be seen that the energization of each of the other relays, 79, 81, 82 and 83 will close particular contacts and provide positive and negative charge to given ones of capacitors 89 through 92 which, when subtracted from the input signals to the threshold circuits 43 through 46, will adjust the phoneme boundary lines in a manner which will reduce the frequency of repeated occurrence of the associated phonemes at the typewriter 70.

It is seen from the preceding discussion that a speech recognition system is provided including an automatic adjustment feature which enables the system to be operated by a variety of different speakers.

In the embodiment described above, use was made of one particualr statistical property of the system output, namely the relative frequency of the phonemes. It is to be understood, however, that other information might be used, such as the frequencies of phoneme combinations.

Also, the statistical properties of the signals can be examined before they are translated into phonemes, and thus adjustments might be made before errors become apparent in the system output. Furthermore, use may be made of many different statistical properties of the signal. For example, it may be found that repeated occurrences of the sound "s" are similar to each other, but that they are quite different from most occurrences of the sound "sh." In such cases, all sounds which are sufficiently similar to each other may be grouped into one phoneme, and those that are different, into another, with the boundary adjusted so that it does not bisect any group of similar sounds, that is, so that the large majority of sounds are not near the boundary, but clearly on one side or the other.

Other modifications are possible within the scope of the present invention. For example, the automatic adjustment signals may be combined with fixed threshold signals in such a way that the automatic circuitry is only permitted to move the thresholds within given fixed limits. If the correct proportions of phonemes are not reached within the limits, there is usually reason to believe that the signal is so abnormal as to be unsuitable for the system, for example, foreign language or severe background noise.

The present invention may also be used to identify a particular speaker, or a language or a dialect. For example, if the bias voltages across the capacitors 89 through 92 are measured after the system machine has become adjusted to the particular voice, then these voltages serve as a description of that voice, and may be used to identify it.

While the invention has been particularly shown and described with reference to a preferred embodiment thereof, it will be understood by those skilled in the art that various changes in form and details may be made therein without departing from the spirit and scope of the invention.

What is claimed is:

1. A sound printing system comprising in combination:

first means for transforming vocal sounds into representative electrical signals, second means coupled to said first means for producing first and second output signals representative of the first and second formants of said vocal sounds respectively, third means coupled to said second means and responsive to said first and second formant signals for producing a plurality of output signals, said output signals being modified combinations of said first and second formant signals arranged as linear functions defining the relationship of said vocal sounds with respect to separate phoneme regions, logic means responsive to said output signals from said third means representative of said boundary defining functions for producing a plurality of output signals representative of separate phonomes contained in said vocal sounds, printing means responsive to said output signals from said logic means for translating said output signals into printed indicia representative of said phonemes, and adjustment means having one side thereof coupled between the output of said third means and the input of said logic means and the other side thereof coupled between the output of said logic means and the input of said printing means and responsive to the output signals from said logic means for modifying the output signals from said third means in accordance with the frequency of occurrence of the separate phonemes.

2. A sound printing system according to claim 1 wherein said third means includes a first plurality of modifying means responsive to said first formant signals for producing a plurality of modified first formant signals, a second plurality of modifying means responsive to said second formant signals for producing a plurality of modified second formant signals, and a third plurality of modifying means, each responsive to the modified signals from separate combinations of said first and second plurality of modifying means for producing a plurality of output signals, said output signals arranged as linear functions defining the relationship of said vocal sounds with respect to separate phoneme regions.

3. A sound printing system according to claim 1 wherein said third means includes a first plurality of potentiometers each responsive to said first formant signals and each multiplying said first formant signals by a given constant, a second plurality of potentiometers each responsive to said second formant signals and each multiplying said second formant signals by a given constant, a third plurality of potentiometers each responsive to the signals from a separate one of said first plurality of potentiometers and a separate one of said second plurality of potentiometers for adding a given constant signal thereto, the output signal from each of said third plurality of potentiometers being a linear function defining the relationship between said vocal sounds with respect to separate phoneme regions.

4. A sound printing system according to claim 1 wherein said adjustment means includes a plurality of biasing means, each one being adapted to vary the amplitude of a separate one of said output signals from said third means, a source of bias signal, and a plurality of switching means, each one being responsive to a separate one of said output signals from said logic means for connecting said source of bias signal to given ones of said biasing means for varying the amplitude of said output signals from said third means.

5. A sound printing system according to claim 1 wherein said adjustment means includes a plurality of subtracting circuits, each having one of a pair of input leads responsive to a separate one of said output signals from said third means, a plurality of capacitors, each one being connected to the other input lead of a separate one of said subtracting circuits such that electrical potential stored in said capacitors is subtracted from said output signals from said third means for varying the amplitude of the output signals from said subtracting circuit, a plurality of threshold circuits, each one being coupled between the output of a separate one of said subtracting circuits and the input of said logic means for providing a first binary signal to said logic means for output signals from said subtracting circuits above a given amplitude and a second binary signal for output signals below said given amplitude.

a source of electrical potential, and a plurality of switches, each one being responsive to a separate one of said output signals from said logic means for connecting said source of electrical potential to given ones of said capacitors.

6. A sound printing system comprising in combination:

a speech responsive means for transforming vocal sounds into representative electrical signals, a formant determining means coupled to said speech responsive means for producing first and second output signals representative of the first and second formants of said vocal sounds respectively, a first plurality of potentiometers coupled to said formant determining means, each responsive to said first formant signals and each multiplying said first formant signals by a given constant, a second plurality of potentiometers coupled to said formant determining means, each responsive to said second formant signals and each multiplying said first formant signals by a given constant, a third plurality of potentiometers, each one being coupled to a separate one of said first plurality of potentiometers and said second plurality of potentiometers for combining the signals therefrom and adding a given constant signal thereto, the output signal from each of said third plurality of potentiometers being a linear function defining the relationship of said vocal sounds with respect to separate phoneme regions, a plurality of differential amplifiers, each having one of a pair of input leads coupled to the output of a separate one of said third plurality of potentiometers, a plurality of capacitors, each one being connected to the other input lead of a separate one of said differential amplifier such that electrical potential stored in said capacitors is subtracted from output signals from said third plurality of potentiometers for varying the amplitude of the output signals from said differential amplifiers, a plurality of threshold circuits, each one being coupled to the output of a separate one of said differential amplifiers for providing a first binary signal for output signals from each differential amplifier above a given amplitude and a second binary signal for ouput signals below said given amplitude, a logic circuit responsive to the binary signals from said threshold circuits for providing a plurality of output signals representative of the phonemes present in said vocal sounds, a source of electrical potential, a plurality of switches, each one of which being responsive to a separate one of said output signals from said logic circuit for connecting said source of electrical potential to given ones of said capacitors, and a typewriter responsive to the output signals from said logic circuit for translating said signals into printed indicia representative of said phonemes.

7. A sound printing system comprising in combination:

means for transforming vocal sounds into representative electrical signals, means responsive to said representative electrical signals for providing first output signals $f_1$ representative of the first formants of said vocal sounds and second output signals $f_2$ representative of the second formants of said vocal sounds, a first plurality of modifying means responsive to said first output signals $f_1$ for producing a plurality of output signals $k_{11}f_1, k_{21}f_1, \ldots k_{n1}f_1$ where $k_{11}, k_{21} \ldots k_{n1}$ are separate constants, a second plurality of modifying means responsive to said second output signals $f_2$ for producing a plurality of output signals $k_{12}f_2, k_{22}f_2 \ldots k_{n2}f_2$ where $k_{12}, k_{22} \ldots k_{n2}$ are separate constants, a third plurality of modifying means for combining said output signals from said first and second modifying means and adding constant signals thereto for producing a plurality of output signals $$k_{11}f_1+k_{12}f_2+k_{13},\ k_{21}f_1+k_{22}f_2+k_{23},\ \ldots\ k_{n1}f_1+k_{n2}f_2+k_{n3}$$

where $k_{13}, k_{23} \ldots k_{n3}$ are said added constant signals and where said output signals from said third plurality of modifying means are linear functions defining the relationship of vocal sounds with respect to separate phoneme regions, a plurality of threshold circuits having threshold levels $T_1, T_2, \ldots T_3$ each responsive to the output signals from a separate one of said third plurality of modifying means for providing a "1" binary signal when said output signals are above the threshold level and a "0" binary signal when said output signals are below the threshold level, said binary signals being representative of separate phoneme regions.

logic means responsive to said binary signals from said plurality of threshold circuits for producing a plurality of output signals representative of separate phonemes present in said vocal sounds, and printing means responsive to said output signals from said logic means for translating said output signals into printed indicia representative of said phonemes.

8. A sound printing system according to claim 7 further including an adjustment means for adjusting the system to be responsive to the voices of different speakers, said adjustment means having one side thereof coupled to the outputs of each of said third plurality of modifying means and the other side thereof coupled to the output of said logic means and responsive to the output signals of said logic means for varying the amplitudes of the output signals from said third plurality of modifying means in accordance with the frequency of occurrence of the separate phonemes.

9. A sound printing system comprising in combination:

first means for transforming vocal sounds into representative electrical signals, second means coupled to said first means for producing output signals representative of the formants of said vocal sounds, third means coupled to said second means and responsive to said formant signals for producing a plurality of output signals, each of said output signals being an analog representation of a function of said formants, said functions defining the relationship of said vocal sounds with respect to separate phoneme regions, logic means responsive to said output signals from said third means representative of said phoneme regions for producing a plurality of output signals representative of separate phonemes present in said vocal sounds, an adjustment means coupled between the output of said third means and the input of said logic means and responsive to the output signals from said logic means for modifying the output signals from said third means in accordance with the frequency of occurrence of the separate phonemes, and printing means responsive to said output signals from said logic means for translating said output signals into printed indicia representative of said phonemes.

References Cited by the Examiner

UNITED STATES PATENTS 2,540,660 2/1951 Dryfus -------------- 178—31

KATHLEEN H. CLAFFY, *Primary Examiner.*

WILLIAM C. COOPER, *Examiner.*

R. MURRAY, *Assistant Examiner.*